United States Patent Office 3,414,467
Patented Dec. 3, 1968

3,414,467
GYPSUM WALLBOARD AND PROCESS OF MAKING THE SAME
Peter J. Ferrara, New York, N.Y., assignor to Keep Chemical Company, New York, N.Y., a corporation
No Drawing. Filed Sept. 3, 1964, Ser. No. 394,351
4 Claims. (Cl. 161—266)

ABSTRACT OF THE DISCLOSURE

A process for producing gypsum plaster wallboard is disclosed in which there is incorporated into a slurry of gypsum and water a mixture of raw or unmodified starch and an enzyme capable of modifying the starch in situ. The resulting mixture is thoroughly blended, deposited between paper liners and allowed to set. The set forms are then dried. The resulting wallboard is characterized by its enhanced strength, rigidity, hardness, resistance to compression, etc.

The starch is used in an amount of from 0.05% to 0.60% referred to the gypsum, and the enzyme (potency of 5.0 D.U.) in an amount of from 0.10% to 0.75% referred to the starch.

---

This invention relates to gypsum products and the preparation thereof. More particularly, this invention relates to gypsum plasters and plaster products, such as wallboard, plaster board, and the like, and also to particular methods for producing these products from admixtures of gypsum with farinaceous materials, raw and crude starches, dextrines and the like.

It is known that calcined gypsum plasters, when mixed with water, will re-combine therewith, and the gypsum-water mixture or slurry will set or harden as the calcium hemihydrate combines with the water and is converted into the dihydrate form.

In the manufacture of gypsum wallboard, a central core of gypsum plaster is deposited between two sheets of heavy liner paper, allowed to set or firm, and thereafter dried in tunnel kilns. As produced in the early period of wallboard manufacture, the evaporation of excess water was carried out slowly over periods of up to twenty hours or more. The prolonged drying time was necessary due to the fact that the drying temperatures were maintained at low levels until the board is dry. A too rapid calcination or overheating of the dihydrate crystals causes them to be reduced to calcium sulfate anhydrate which exists in a powdery state so that the resulting core lacks sufficient strength, rigidity and hardness, and, furthermore, the bond between the core and the paper liners is wholly inadequate or totally absent. In order to accelerate the drying time it has been proposed to incorporate in the gypsum plasters various materials, such as cooked starches, modified starches, and dextrines.

The modified starches, starch products, and the dextrines are materials characterized by their water-retention capacities. When these materials are blended either wet or dry into the slurries intended for use in making gypsum wallboard, it is important these ingredients have the capacity to migrate to the areas between the paper liners and the gypsum surfaces adjacent to the paper liners, and, through their water-retention ability, prevent the overheating of the re-crystallized gypsum needles which extend into the paper fibers, thus preventing the powdery calcination of these crystals and preserving the bond between the gypsum core and the paper liners.

While advantages and improvements as to the wallboard product were observed, as a result of the incorporation of the farinaceous materials as practiced in the art, this practice carried with it certain other defects, particularly because the incorporation of the cooked or dextrinized farinaceous material made it necessary to use considerably greater quantities of water to achieve the proper limits of a pourable slurry-mix. Substantially all this extra water had to be removed in the drier.

The farinaceous materials or dextrine which have, up to the instant invention, been employed in the production of gypsum wallboard have one particular property in common, and that is each is characterized by a degree of water solubility or ability to hydrate and swell in the presence of water. This characteristic ranges from moderate to quite substantial, depending upon the material in question and the extent of its being modified. Accordingly, the presence of any of these in the gypsum slurry results in the development of some "gel" or "sol" contributing to an increase in the viscosity of the slurry mix. As a result of this condition it has been necessary to increase the amount of water incorporated into the plaster to produce a given consistency. Certain of the most desirable physical and mechanical properties of kilned dried gypsum plasters are strength, toughness, resistance to compressibility, and bending, and, in some instances, high density. These factors are known to the art to be improved in most cases by reducing the so-called $W/P$ ratio—ratio of water (W) to plaster (P). Accordingly, with the incorporation of larger amounts of water in the plaster, the desired improvement in strength, hardness, and other mechanical and physical properties may not be obtained.

It is an object of the invention to produce gypsum plaster wallboard wherein the paper liners are tightly bound to the gypsum cores.

It is another object of this invention to produce gypsum plaster wallboard which will have the improved strength, rigidity, toughness, hardness, compressibility, and desired density.

It is a further object of the invention to achieve these ends by means of the most economic grades of raw or crude starches and farinaceous materials and without any pre-treatment or modification thereof prior to their incorporation in the gypsum slurry preparations.

It is a still further object of this invention to achieve these ends using smaller quantities of the farinaceous materials than heretofore have been possible.

It is still another object of this invention to provide a process for reducing the proportion of water required to make a slurry of specific consistency with gypsum.

It is also among the objects of this invention to provide a process for increasing the speed of production of gypsum wallboard, and reducing the cost of such production and which enables the production of a wallboard of enhanced strength, rigidity, hardness, resistance of compression, etc.

These and other objects and advantages will be made apparent from the ensuing description of the invention and from the hereunto appended claims.

In accordance with the invention it has now been discovered that the above and other desirable objects may be achieved by preparing a slurry of calcined gypsum and water and incorporating into such slurry a mixture of a raw or unmodified starch and an enzyme capable of modifying the starch in situ.

In accordance with the invention there may be utilized any gypsum plasters conventionally employed for making wallboard or for the production of casts or molds for decorative objects. The plasters may be mixed with the usual additives, such as wood fiber, paper fiber, paper pulp, rosin, size, and other agents acting to cause the plaster to set within a preferred interval of time after forming, including both agents for retarding or accelerating setting.

As enzymes suitable for the purposes of the invention, there may be used any enzyme or mixture thereof which is capable of acting on the starch molecules rapidly, and beginning to so act at low temperatures. Moreover, the enzyme must be capable of enzymatic activity over a broad range of temperatures, including up to 200° F. or higher, and be suitable to the environmental conditions imposed by the ingredients in the gypsum slurries.

The in situ reaction of starch and enzyme in accordance with the invention makes possible a number of considerable advantages compared with the prior art practices of incorporating a modified or gelatinized starch in gypsum plasters. The first of such advantages is derived through the near insoluble or small water absorbing capacity of the farinaceous material or raw starch. This characteristic affords a particular advantage over the use of pregelatinized or partially soluble materials, in that as the raw starch when added has no thickening property by virtue of its uncooked or insoluble state, it is now possible to use much less water to form and maintain the same degree of slurry consistency. This not only lessens the amount of excess water which must be evaporated but, through a decrease in the $W/P$ ratio, prevents the reduction in the strength, resiliency, toughness, etc., which is experienced with gypsum plasters made with a larger amount of water.

Another advantage resulting from the in situ enzymatic action stems from the fact that, when 100 pounds of starch solids are acted upon by enzymes having amylolytic or hydrolytic activity, the resulting biochemical action produces 107.5 to 108 pounds of solid material, depending upon the chain lengths of the resultant molecules. Thus, because of this phenomena, there occurs, on the one hand, an actual increase in the final weight of the starch materials and, on the other hand, the increase in weight is at the expense of the excess water present in the slurry; some of which becomes molecularly used up in the starch conversion, causing still a further reduction in the amount of excess water which has to be removed in the evaporation step.

The preferred enzyme for use in the production of the gypsum wallboard in accordance with the invention may be any of the commercially available starch enzymes, subject to certain limitations. The preferred enzyme should not be incompatible with the ingredients of the gypsum slurries and the pH of the mix, and shall have satisfactory enzyme kinetics with broad temperature tolerance. Moreover, the enzyme should be adapted to maintain a satisfactory level of enzyme activity in a system with limited mechanical mixing, and, of course, it must not have an unfavorable action on the setting properties of the gypsum.

Without in any way limiting the selection of the enzyme to be used in the invention, amylolytic and proteolytic enzymes of bacterial origin separately or in combination, which are resistant to high temperatures, those indicated as preferred, can be obtained from Rohm & Haas Company (Philadelphia, Pa.), Wallerstein Company, Inc. (Staten Island, N.Y.) and Miles Chemical Co. (Elkhart, Ind.). As particular examples of those enzymes which have been tested and found to have the desirable characteristics for use in this invention are Rhozyme DX and Rhozyme H-39 of Rohm and Haas; Amyliq concentrated of Wallerstein; and HT-1000 of Miles Chemical. These enzymes have demonstrated high potency and continued diastatic enzyme action at temperatures up to 195° F., and for periods of 10 to 15 minutes. It is well known in the art of enzymatic actions of liquefying or dextrinizing enzymes that the kinetics of enzyme conversions are usually better maintained in the presence of calcium ions. Calcium appears to have a particularly useful property of protecting the enzyme from the deterioration aspects of heat, pH variations, and time. The gypsum slurries represent, accordingly, a most favorable medium in which these enzymes can act.

In order that the nature of the invention be more clearly understood, it is believed desirable to set out briefly the nature of the chemical reactions involved in the formation of gypsum. The chemistry of the conversion of the calcium sulfate hemihydrate to the dihydrate may be represented by the following reaction:

$$(CaSO_4)_2 \cdot H_2O + 3H_2O \rightarrow 2CaSO_4 \cdot 2H_2O + 3900 \text{ cal./gram}$$

The pertinent solubilities of the several forms of calcium sulfate at 20° C. are as follows:

| Type | Formula | Solubility, gms./l. |
|---|---|---|
| Dihydrate | $CaSO_4 \cdot 2H_2O$ | 0.2 |
| Hemihydrate | $(CaSO_4)_2 \cdot H_2O$ | 0.9 |
| Anhydrous (or anhydrite) | $CaSO_4$ | 0.3 |

As small amounts of the relatively less soluble dihydrate are formed, crystals of gypsum appear which grow and become entangled with each other, this effect contributing to the strength and rigidity of the set plaster. With the production of a set plaster consisting of interlocking strong monoclinic gypsum crystals, it now becomes important for producing wallboard, to avoid the overheating which can cause a changeover to the orthorhombic calcium sulfate anhydrite which is powdery and offers little strength, and which develops quite readily at temperatures between 300°–375° F. It is at this point that the starch materials and dextrines must effect the required retention of water, thus bringing about the protection of the monoclinic crystalline structure from too high a temperature.

It is believed apparent that, if the in situ modification of the starch by the enzyme is to produce adequate results, i.e., protection, it is essential for the enzyme to cause a rapid conversion of the raw starch. In accordance with a preferred embodiment of the invention, this is made possible by including in the gypsum slurry system a wetting agent and preferably as the wetting agent including in the system borax or sodium tetraborate. This mildly alkaline material is relatively inexpensive and, furthermore, readily available. Additionally, borax seems to have the least effect of all wetting agents tested on the setting properties of the gypsum slurries and also enjoys a unique degree of compatibility with the liquefying and dextrinizing enzymes.

In the investigation of suitable wetting agents and particularly the effectiveness of borax, it was discoveretd that the introduction of borax into the gypsum slurry containing a starch or flour and an enzyme, produced results of a synergistic nature. The use of borax results in fully effective and tenacious bonding of the paper liners to the gypsum core and that with exceedingly small amounts of the starch enzyme components. The reasons are not fully understood though the explanations supporting these curiously novel developments stem from several known properties of borax in the presence of starch and starch compounds. One is that in the presence of small quantities of borax, all starches are known to imbibe water, and swell or gelatinize at lower temperatures. This would, of course, hasten the process by which the enzyme modifies the starch molecule. In addition to this, borax in the presence of starch displays a relatively weak yet significant bifunctional activity, forming cross-links with and between the starch molecules, and these links are presumed to form, and disassociate, rather continuously. As some portion of the starch is broken into glucosidic units, the borax as may be expected also enters into a simultaneous reaction forming and "unforming" a diglucose borate. This glucose linkage has been shown to be a compound having the same relative labile property as ascribed to the starch. It is probably this fluid or labile state of the starch and "glucose" molecules which gives rise to the unusual and efficient action of the enzymes thus incorporated with the starches in the gypsum slurries.

Further, it is believed that borax combines with gypsum-forming calcium borate ($CaB_4O_7 \cdot 6H_2O$) at salt which moderately soluble in water and therefore is a useful and highly beneficial reservoir of calcium ions. These calcium ions stimulate to an exceptional extent the enzyme activity, and impart to the enzyme an excellent degree of resistance to heat deterioration. A good deal of the extra toughness or strength of the gypsum core over that which may be derived from a gypsum core produced from the same calcined product, processed in a manner other than described by the invention, can be ascribed to the toughness and hardness of the calcium borate crystals residual in the gypsum core when the product is ultimately dried.

The enzymes employed are those commercially available and are usually powders compounded with buffers. The buffering agents serve several purposes. The addition of buffers to the enzyme preparation enables the maintenance of the pH of the systems, close to the range of optimum conversion for a particular enzyme. Still another function of the buffers is to simultaneously impart "ionics" which sustain the enzymatic action over a wider range of conditions. Also through the addition of very low cost buffering chemicals such as monosodium phosphate, disodium phosphates, magnesium chloride, calcium sulfate, and compounds of a similar type, the potency of the enzyme is diluted to specific levels generally referred to as D.U., dextrinizing units. The number of D.U.'s assigned to a particular enzyme is an approximate measure of the amount of starch which can be modified to a dextrine per unit of enzyme in a given interval of time. In accordance with the invention it has been found that there can be used much less than the theoretical D.U. quantities because it is not necessary to effect complete conversion of starch to a dextrine.

Preferably in the gypsum wallboard process in accordance with the invention, the enzymes are used without any buffering agents, or, if any, containing only such agents as not interfering with the forms of strong gypsum crystals. This point must be carefully watched due to the fact that most of the preferred commercial buffering agents exercise strong retarding or accelerating action on the rate of setting of the gypsum (see Bureau of Mines—Report of Investigations 5477) "Hydration—Rate Studies of Gypsum Plasters=Effects of Small Amounts of Dissolved Substances."

The examples below will illustrate more clearly the mode of carrying out the process of this invention and the product obtained thereby.

Example 1

300 grams of calcined gypsum designated as "stucco," produced by the "IMP-MILL Flash Drying" process, are weighed out ready for use. 140 ml. of warm water (112–115° F.) and 60 ml. of a pulpy emulsion of newspaper in water were introduced into a 1 liter size plastic beaker. The newspaper, pulp and water mixture was prepared by blending 15 g. of paper in 585 ml. of water in a Waring Blendor. 0.15 gram of potassium sulfate and 0.28 gram of finely ground gypsum (dihydrate) as hydration accelerators were included in the water. 5.4 ml. of 0.01% borax solution were then added.

A pre-mix of tapioca and the preferred enzyme, referred to as "Enz-5.0," is prepared with tapioca diluting the enzyme potency to a level of 5.0 D.U. (dextrinizing units). The "Enz-5.0" is mixed with tapioca, 0.34 part of "Enz-5.0" to 99.66 parts of tapioca. This tapioca-enzyme mixture may be referred to as the gypsum core binder starch and is a novel product per se, in the same fashion as the term has been applied to dextrines and acid-modified starches or flours. The present form of farinaceous core binder materials will be hereinafter identified as core binder starch. Then 0.18 gram of the core binder mixture of tapioca and enzyme was added to the 300 grams of stucco.

The mixture of stucco and the tapioca core binder was then added to the warm water and other ingredients, and quickly blended for 10 seconds with an "egg-beater." At the end of 10 seconds of mixing, 65 ml. of a durable or stable foam was blended into the slurry and the mixing continued at the same speed for 15 additional seconds. The foam was introduced as a means of adding air bubbles to the gypsum slurry, so as to lower the density of the gypsum core to the specifications of weight per unit area. The amount of foam and its density will vary a great deal depending on requirements. In this run Hercules Resin Size 249 at a foam density of 10 pounds per cubic foot was used. This foam was easily produced in a Waring Blendor by taking 55 grams of Resin Size, and agitating it rapidly until the volume of a stable foam in the blender rose to 350 ml.

After all the ingredients had been thoroughly blended, the gypsum slurry was poured onto a piece of liner paper set inside a rectangular frame, forming the edges of the board sample. The liner board measured 4½" x 5". The frame was ½" in depth. As soon as the slurry had filled the mold, another piece of liner board, identical in size to the bottom liner was pressed on the slurry surface so the excess slurry could be displaced. In 6 to 8 minutes the slurry was set and the forming mold removed. The ½" thick pieces of wallboard were oven dried in a gas fired oven with air circulating at 390° F. The measurement of residual moisture in the core being tested was carried out with both a moisture meter (Hart Moisture Meter Co., West Islip, Long Island, Meter R-27 or L-436) and to a constant weight. A piece of ½" wallboard produced in this way weighed approximately 140 grams. A comparison of initial wet weight and final weight showed a water removal under these conditions of 65–70 grams within 40–50 minutes. To avoid any tendency for stratification to occur, the test samples were placed on edge in the drying atmosphere.

When the gypsum samples were cooled to room temperature, the cores were tested for "°% peel" at room conditions, as well as after having been stored in a storage cabinet for 24 hours at 90° F. and 90% R.H. (relative humidity). Average bond peel ranged from 0% to a maximum of 4.5%. This result was superior to that obtained through the use of four times of this quantity identified as a "High Grade" acid-modified corn starch.

Example 2

The same procedure as was used in the preparation of the previous example was used in this case. All quantities were the same, except that a finely ground, degerminated (dry-milled) corn flour was substituted for the tapioca. In this case, the amount of corn flour used as the core binder mixture was increased to 0.25 gram. The enzyme wth a potency of 5.0 D.U. (Enz-5.0) was used at a level of 0.44% based on the crude corn flour, i.e., 0.44 part to 99.56 parts corn flour. The amount of borax (added as a solution) calculated on the flour was 0.23%. Instead of Resin Size 249, there was used a foam prepared from an ammonium lauryl sulfonate (Dupont Company—Dupanol AM) at a foam density of 11.6 lbs. per cubic foot.

The tests on the dried pieces of wallboard were similar to those made with tapioca starch.

Example 3

When Example 1 was repeated using 0.8 gram of the tapioca and in the absence of borax, a wallboard product having substantially similar properties was obtained.

With regard to the improvement ni the tensile and compressive strengths of gypsum, caused by using less water to prepare pourable gypsum slurry mixtures as practiced by the invention, the order of improvement cannot be precisely stated as applicable to all cases. The so-called W/P ratio, or the term "normal consistency" is defined as the number of grams or cubic centimeters of water, which, when mixed with 100 grams of dry stucco, will produce a mix of such consistency that it will just pour from a cup. Thus, the figure expresses the percentage of water based on the weight of stucco.

While the usual sources of calcined gypsum are products derived from the mining of natural deposits, the calcium sulfate content of the deposits is in itself a variable. Satisfactory results have been reported for raw natural gypsum ranging in assay from 82–84% up to high purity gypsums above 95%. This range, notwithstanding the utilization of starch and enzyme mixes, as proposed herein, has given indications of a $W/P$ ratio which is 3–5 points lower than the value which would have otherwise been obtained by the use of conventional core binder materials, and this lower $W/P$ ratio is sufficient to cause a 10–25% increase in corresponding compressive and tensile strengths.

According to the present invention, it has been found that the amount of core binder starch required based on the weight of gypsum, to be admixed in the slurry of water and gypsum is from 0.05% to 0.60%; preferably from 0.16% to 0.40% is added.

The borax is suitably added in an amount of from 0.06% to 0.40% based on the core binder starch present in the mixture. Preferably from 0.10% to 0.33% of the borax referred to the starch is added.

In the practice of this invention, a small amount, for instance, from 0.10% to 0.75% of the enzyme having a potency of 5.0 D.U. referred to the starch is added to the slurry. Preferably, there is incorporated into the slurry 0.12% to 0.36% of the enzyme having a potency of 5.0 D.U. based on the starch present.

In the commercial manufacture of the gypsum wallboard in accordance with the invention, core binder starch loading in an amount as low as 2 pounds per ton may be employed, with consistently good results being obtained with starch amounts under 4 pounds per ton (these amounts applying per ton of dried commercial wallboard of ½" thickness).

In the customary procedures for preparing gypsum wallboard on an industrial scale, an average of 10 pounds per ton of board of starch is employed, and, starch in amounts as high as 12 to 14 pounds per ton of board being quite usual. While there are reported instances of figures as low as 8 pounds per ton, the invention provides for consistently good results, using amounts of starch of less than 4 pounds per ton, a saving of 50% of the best figures now obtained. The above values are based on a board ½" thickness.

I claim:

1. A set gypsum plaster product resulting from the setting of a mixture of gypsum plaster, borax, water, raw starch and an enzyme capable of modifying the starch in situ, said gypsum plaster being present as the predominant component of said mixture, the amount of raw starch being substantially in a range between 0.05% to 0.60% by weight per 100 parts of gypsum plaster and the amount of enzyme being substantially in the range between 0.10% to 0.75% by weight referred to the starch wherein said enzyme has a potency of 5.0 D.U., and the amount of borax being substantially in the range between 0.06 to 0.40% by weight referred to the starch.

2. A gypsum plaster wallboard product according to claim 1 resulting from the setting of a mixture of gypsum plaster, borax, water, raw starch, and an enzyme capable of modifying the starch in situ, said gypsum plaster being present as the predominant component of said mixture, the amount of raw starch being substantially in a range between 0.05% to 0.60% by weight per 100 parts of gypsum plaster and the amount of enzyme being substantially in the range between 0.10% to 0.75% by weight referred to the starch wherein said enzyme has a potency of 5.0 D.U., and the amount of borax being substantially in the range between 0.06 to 0.40% by weight referred to the starch, between paper liners.

3. Process of producing gypsum castings which comprises producing a slurry of gypsum plaster, borax and water, incorporating into said slurry a mixture of raw starch and an enzyme capable of modifying the starch in situ, said gypsum plaster being present as the predominant component of said resulting slurry, the amount of raw starch being substantially in a range between 0.05% to 0.60% by weight per 100 parts of gypsum plaster and the amount of enzyme being substantially in the range between 0.10% to 0.75% by weight referred to the starch wherein said enzyme has a potency of 5.0 D.U., and the amount of borax being substantially in the range between 0.06 to 0.40% by weight referred to the starch, forming the said slurry into predetermined form and allowing the slurry to set to form a casting.

4. Process of producing a gypsum wallboard which comprises producing a slurry of gypsum plaster, borax and water, incorporating into said slurry a mixture of raw starch and an enzyme capable of modifying the starch in situ, said gypsum plaster being present as the predominant component of said resulting slurry, the amount of raw starch being substantially in a range between 0.05% to 0.60% by weight per 100 parts of gypsum plaster and the amount of enzyme being substantially in the range between 0.10% to 0.75% by weight referred to the starch wherein said enzyme has a potency of 5.0 D.U., and the amount of borax being substantially in the range between 0.06 to 0.40% by weight referred to the starch, depositing said slurry between paper liners, allowing the slurry to set in predetermined form and drying said predetermined form whereby said paper liners and said gypsum mixture are interlocked to form a gypsum wallboard of improved properties.

References Cited

UNITED STATES PATENTS

| | | | |
|---|---|---|---|
| 2,200,839 | 5/1940 | Fleck | 161—266 |
| 2,258,741 | 10/1941 | Champion et al. | 127—38 |
| 2,824,037 | 2/1958 | King | 161—266 |
| 2,894,859 | 7/1959 | Wimmer et al. | 161—266 |

MORRIS SUSSMAN, *Primary Examiner.*